April 7, 1964  HANS GEORG MÖLLER ETAL  3,128,460
PRODUCTION OF A PICTURE OF THE TRUE PATHS OF MOTION OF RADAR TARGETS
Filed Nov. 20, 1957  3 Sheets-Sheet 1

INVENTORS
HANS-GEORG MÖLLER
CARL WILHELM BUSCH
FRIEDRICH-WILHELM KALMEYER
BY Ezekiel Wolf
their attorney

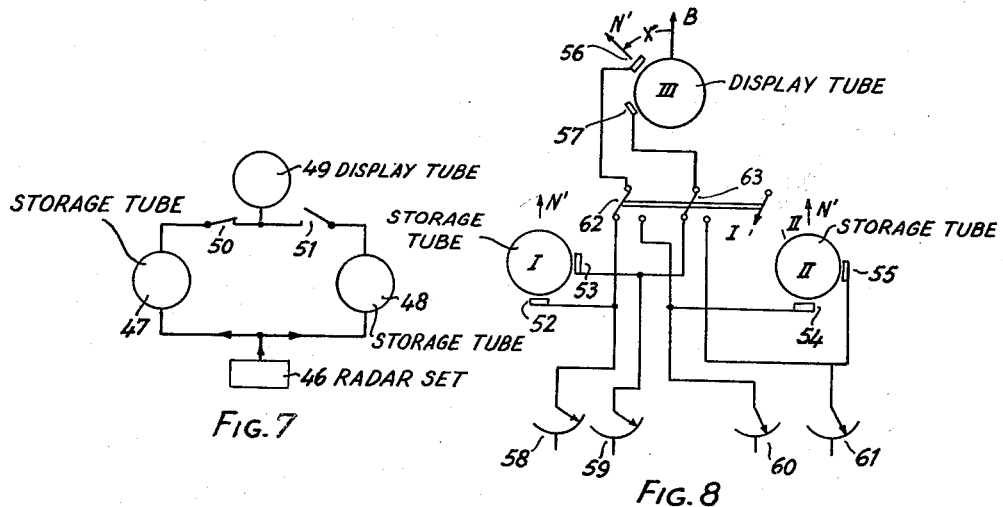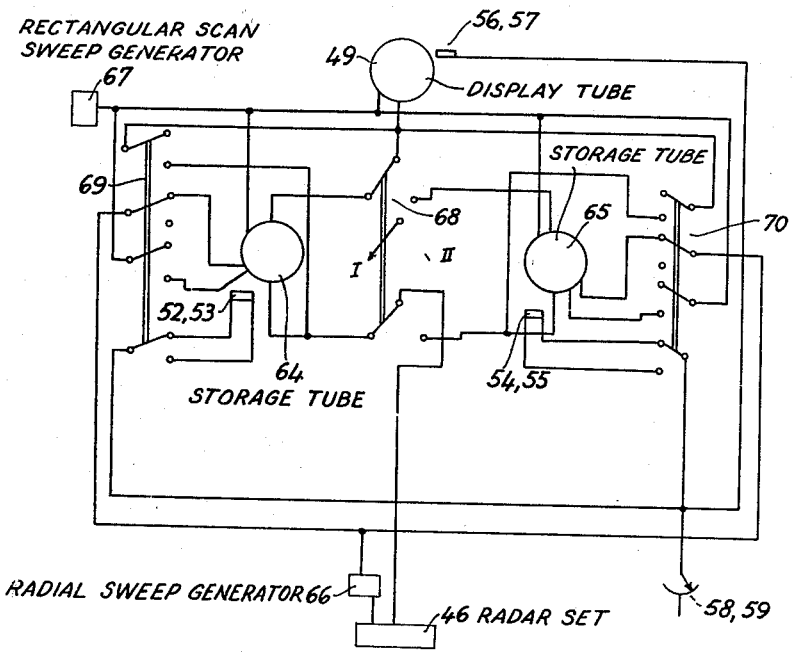

April 7, 1964  HANS GEORG MÖLLER ETAL  3,128,460
PRODUCTION OF A PICTURE OF THE TRUE PATHS OF
MOTION OF RADAR TARGETS
Filed Nov. 20, 1957

INVENTORS
HANS-GEORG MÖLLER
CARL WILHELM BUSCH
FRIEDRICH-WILHELM KALLMEYER
BY Ezekiel Wolf
their attorney

United States Patent Office 3,128,460
Patented Apr. 7, 1964

3,128,460
PRODUCTION OF A PICTURE OF THE TRUE PATHS OF MOTION OF RADAR TARGETS
Hans Georg Möller, Hamburg-Bergedorf, and Carl Wilhelm Busch and Friedrich Wilhelm Kallmeyer, Bremen, Germany; said Möller and Busch assignors to Atlas-Werke Aktiengesellschaft, Bremen, Germany
Filed Nov. 20, 1957, Ser. No. 697,565
Claims priority, application Germany Nov. 26, 1956
11 Claims. (Cl. 343—5)

This invention relates to the production of a picture of the true paths of motion of radar targets and is an improvement in or modification of the invention described and claimed in the co-pending application of Hans G. Möller and Friedrich W. Kallmeyer entitled Radar Set, Serial No. 622,684, filed November 18, 1956, now Patent No. 3,055,000.

The copending application relates to the production of a picture of the true paths of motion of objects situated in the range of a radar set provided on a moving ship. This is accomplished by projecting a series of instantaneous pictures on a single display surface. These instantaneous pictures are obtained with the radar set over a relatively long period and display the position of such objects with respect to the observing ship, taking into account the progress of the ship having the radar set and the geographical orientation of the instantaneous pictures. On such a single display surface, the position of a fixed target obtained at different times remains unchanged. On the other hand, the portion of a moving target, for example another ship, is periodically displaced along a path line corresponding to the true course of such other ship. When time marks are provided, its speed as well can be immediately recognized. In the course of displaying the true movements of targets, the single display surface also shows the displaced starting points of consecutive instantaneous pictures corresponding to the path traveled by the observing ship.

The copending application discloses systems employing an electron beam or the action of light to visibly record instantaneous pictures obtained on the radar screen. For this purpose, various arrangements are shown, some being relatively expensive. While the system disclosed in the co-pending application utilizing the high persistence of a phosphorescent screen to store instantaneous pictures derived on preceding scans is not too costly, only relatively short portions of the paths of motion are visible at any time; namely, only the portions recorded in the last minutes before the immediate observation due to the rapid decay in light intensity.

Accordingly, the present invention contemplates and has as an important object increasing the portions of the paths of motions displayed with but a relatively small increase in cost. This is accomplished by the use of at least two image storage tubes. Recordings are produced on the storage tube screens in the form of a charge relief pattern. These recordings are rendered visible on the screen of a conventional display picture tube whose beam intensity is controlled by the signals stored on a selected one of the storage tube screens as the display tube and selected storage tube are scanned in synchronism. The recording electron beams in the storage tubes are additionally deflected in accordance with the progress of the observing ship to record a picture composed of the instantaneous pictures of a radar set, thereby showing true paths of motion. As a result, the recording electron beams are cyclically offset from the center of the storage tube screens and, if desired, returned to the center so that the picture of paths of motion present on the screens of the picture storage tubes and rendered visible on the screen of the display tube is constantly updated by new instantaneous pictures.

In devices according to the aforesaid copending application, especially when use is made of a plane picture surface, the picture surface corresponds to a predetermined part of the surface of the earth. Accordingly, during the travel of the observing ship, the displayed image of the latter eventually leaves the geographical area represented on the picture surface. When the distance between the ship and the approaching boundary of the currently displayed geographical area is less than a predetermined value, the displayed geographical area must be changed. This necessitates erasing the existing picture and beginning with the recording of a new picture of paths of motion. The picture of the observing ship assumes a starting position which is displaced in a direction opposite to the course being traveled the maximum possible length of the path being traveled without interruption. After the picture field is changed, there is at first doubt about the courses of other ships. This doubt does not disappear until an adequate portion of the paths of motion has been recorded again. Since generally the picture on a high persistence phosphorescent screen cannot be immediately erased, the old and the new picture are in addition superimposed for a certain time to add to the confusion.

These disadvantages could be avoided by recording the pictures of paths of motion of the observing ship and other ships simultaneously on two different picture surfaces, which depict regions displaced relative to one another by a distance corresponding to approximately half the diameter of the picture surfaces (which are assumed as being circular), or less. A change-over is carried out alternately whereby the depicted region is advanced at suitably selected intervals. In this way there would always be available to the observer on one of the two picture surfaces a picture in which the paths of moving targets are recorded over a relatively long period. If the recording is effected by phosphor persistence, however, the determination of the course and the recognition of changes of course of other ships in good time encounter difficulties owing to the shortness of the visible portion of the paths. On the other hand, recordings in the form of a charge pattern on the screen of an image storage tube are capable of lasting a long time, if there is a suitable mode of operation. A modification of the above indicated process, using two or more image storage tubes, will be described inter alia below.

With certain forms of construction of an arrangement according to the invention, other advantages are obtained in addition to the permanence of the recorded picture. For example, problems in evaluating collision dangers due to the fact that the picture of the observing ship always lies at the centre of the picture screen when producing a course-oriented picture are eliminated.

The invention therefore relates in particular to devices for producing a picture of true paths of motion from the instantaneous pictures of a radar set on a picture surface, the picture of the observing ship being automatically kept in the centre of the picture surface or moving only slightly away from and always returning to the vicinity of said centre.

In a radar set serving to produce a circular plan-position picture, pulses of high frequency energy are emitted periodically, at a frequency of 1 kc./s. for example, in varying directions by means of a uniformly turning antenna reflector, rotating for example at 20 r.p.m. In accordance with their time of arrival, the reflected pulses returning from one direction effect the brightness modulation of an electron beam which, in synchronism with each pulse emission, is moved radially outward, from its position of rest usually situated in the centre of the screen, at an azimuth angle corresponding to the direction of emission. On each pulse emission there is thus obtained a linear instantaneous picture of the objects situated in the instantaneous direction of emission, with respect to the observing ship, whose own picture appears at the beginning of each instantaneous picture and is identical to the starting point of the periodic radial deflections of the beam.

In order to enable statements to be made regarding the direction orientation of the instantaneous pictures on the picture screen or on other picture surfaces, the conception of the picture axis, denoted by B, is introduced. The picture axis corresponds to the direction extending from bottom to top to the viewer of the picture surface.

Since the antenna is rotated uniformly with respect to the ship—clockwise rotation is assumed hereinafter—the direction of radiation at any given time referred to the north direction is given by:

(1) $$\sigma_N = \zeta + \frac{2\pi}{T} t$$

where $\zeta$ is the instantaneous course angle of the ship, and T is the time for one revolution of the antenna, with $t=0$ on any one of the passages of the direction of radiation through the ahead direction.

If the north direction N' on the picture screen is given, and a position deviates from the picture axis by the angle $\chi$ in the anticlockwise direction, then in order to obtain the correct association of the orientation of the instantaneous pictures and the direction of radiation at any given time, the radial path periodically swept by the electron beam must at each instant enclose the angle:

(2) $$\sigma_B = \zeta + \frac{2\pi}{T} t - \chi$$

with the picture axis.

If $\chi$ has a constant value, the entire picture is oriented for the viewer to the compass direction $\chi$, especially to the north direction in the case of $\chi=0$. Then:

(3) $$\sigma_B = \zeta + \frac{2\pi}{T} t$$

If $\chi$ is made equal to $\zeta$, that is variable in accordance with the course angle, a course-oriented picture is provided. In this case:

(4) $$\sigma_B = \frac{2\pi}{T} t$$

Devices for transmitting the antenna rotation $$\frac{2\pi}{T} t$$

to a system for the periodic deflection of an electron beam from its position of rest in a variable direction and, on production of a total picture oriented to a constant compass direction are known. They include means for adding a rotation, corresponding to the course followed, by using a servomotor connected to the compass installation of the ship.

In order to obtain pictures of true paths of motion, not only is a correct orientation of the instantaneous pictures with respect to the picture axis in accordance with the Equations 1 to 4 necessary, but it is also necessary to displace the starting point—corresponding to the picture of the observing ship—of the instantaneous pictures on the picture surface. Such displacement is in relation to the position of this starting point in the picture at a determined time in accordance with the progress made by the observing ship as to direction and speed. The variation of the location of the observing ship, referred to a starting position at the time $t=0$, is generally described by a vector functionally related to time, with a fixed point as point of origin. This vector is defined by the equation:

(5) $$\bar{s}(t) = \int_0^t \bar{w} dt$$

where the barred letters indicate vector values, in particular $\bar{w}$ the ship's velocity. The magnitude of $\bar{w}$ is obtained by measuring the ship's speed with a log, while the direction is given by the course angle. Devices for determining the integral value, if desired in the form of components in a system of axes, are described in the cited copending application together with devices for deflecting an electron beam from its position of rest in accordance with $\bar{s}(t)$. When the integration is carried out piece by piece over small periods, for example, during the time T of one antenna revolution, methods of approximation of various kinds are possible for displacement of the starting points of the instantaneous pictures. The individual pictures of objects existing in the instantaneous picture naturally also undergo the same displacement as the starting point. The distance scale for the displacement of the starting point must naturally be the same as that used in the instantaneous pictures to represent the distance of targets from the observing ship.

In order that the invention may be more readily understood, reference is made to the accompanying drawings which illustrate diagrammatically and by way of example several embodiments thereof, and in which:

FIGURE 7 is a diagrammatic connection plan for an arrangement with two storage tubes of the kind illustrated in FIGURE 6, for producing a picture on the screen of a display picture tube showing true paths of motion derived from the instantaneous pictures of a radar set;

FIGURE 8 is a diagrammatic circuit diagram to explain the operation of the deflecting means for the deflection of the recording electron beams in the image storage tubes and the picture tube of the arrangement shown in FIGURE 7, in accordance with the progress of the observing ship;

FIGURE 9 is a development of the arrangement shown in FIGURES 7 and 8, wherein a picture provided on the picture screen of a storage tube can be transferred to the screen of the other storage tube without viewing being interrupted; and FIGURES 10 to 15 illustrate the production of a picture of paths of motion from the joining together of radar pictures in one embodiment of the invention, a picture of paths of motion being transferred back and forth between two image storage tubes and at the same time being complemented by new radar pictures and rendered visible, with the particular feature that the pictures of the paths of motion on the picture screens of the storage tubes are kept course-oriented.

Figure 1:
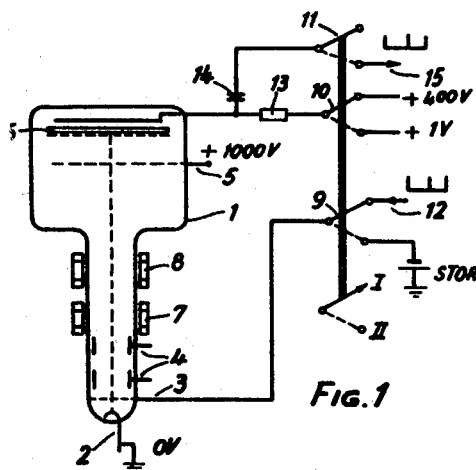
FIGURE 1 is an image storage tube, the picture screen of which can be alternately recorded and scanned by an electron beam passed over the same.

FIGURE 1 shows an image storage tube of the kind used in the embodiment of the invention to be described first.

A heated cathode 2, a grid 3 to control the electron current, a static lens system 4, and an acceleration grid 5 are disposed in a vacuum vessel 1. The electron beam impinges on a picture screen consisting of a mica sheet 6 and having at its front side a metallic coating divided after the style of a mosaic and on the back a continuous metal coating. The cathode 2 is at earth potential, the acceleration grid 5 is at +1000 volts, and a voltage of either +400 volts or +1 volt as desired can be applied to the metal coating of the picture screen by means of a switch 10 through a resistance 13. The electron beam, which in its position of rest impinges on the centre of the picture screen 6, is periodically displaced radially in response to the deflection signals applied to deflecting coils 7, synchronously with the pulse emissions of a radar set. On the picture screen a picture axis is assumed as corresponding to the north direction and the rotating deflection path of the electron beam is angularly oriented with respect to said axis by the same angle as the direction of radiation of the antenna referred to the actual north direction. Other deflecting coils 8 serve to produce an electron beam static deflection which increases intermittently with the progress of time, and hence a deflection of the starting point of the periodic deflections from the position of rest in accordance with the progress of the observing ship. Either the received voltage of a radar set or a constant voltage can be fed to the control grid 3 through a switch 9 ganged with switch 10.

To effect "recordings" on the picture screen 6 which correspond to the instantaneous pictures of the radar set, use is made of the switch position I. The small condensers formed by the mosaic coating of the picture screen 6 are first of all uncharged and charge up positively by the emission of secondary electrons when the electron beam impinges thereon. The electron beam in turn is released by the control grid 3 only when pulses received by the radar set are fed to the said control grid 3 through the line 12. In consequence, and in conjunction with the deflections produced in the electron beam by the coils 7 and 8, a recording of successive instantaneous pictures of the radar set is obtained in the form of a charge picture on the picture screen 6, taking into account the progress of the observing ship. By continuing the recording of the received voltage of the radar set during a relatively large number of antenna revolutions, there would in this way be recorded a picture of paths of motion in which the picture of the observing ship would increasingly move away from the centre of the screen.

The switch position II is used to "scan" a picture recorded on the picture screen 6. The electron beam is passed with constant current intensity over the picture screen, which now lies at a lower voltage. No secondary electrons are therefore released by the electron beam; on the contrary, only the existing charges of the picture screen are neutralized. The charges flowing off produce in a high resistance 13 a variable voltage drop which is taken off through a condenser 14 and fed through the switch 11 and the line 15 to a cathode ray tube serving to render the stored picture visible or to another picture storage tube, where it controls the current intensity of an electron beam. In the present case, scanning of the stored picture entails an erasure. The picture screen is thereupon ready to receive a new picture with the switch set to the position I. In scanning the picture screen it is per se immaterial in what manner the scanning electron beam is passed over the picture screen, provided that the electron beam of the picture or storage tube to which the picture is transferred performs an identical scanning movement. If however the stored picture of paths of motion is to be completed, on the transfer, by the instantaneous pictures simultaneously received by the radar set, then on scanning the picture screen 6 the periodic and the static deflection movement of the electron beam is continued in the same way as in recording the picture screen. The electron beam of the connected picture or storage tube receiving the transferred data undergoes the same periodic and static deflections, but with the difference that there the initial position of the starting point of the deflection may be any one desired, for example identical with the centre of the screen, since no joining up to an existing picture is to be produced on the new screen surface. In re-recording the picture the orientation of the latter may naturally also be varied as desired, an additional rotation of the periodic and static deflection being introduced.

The mode of operation of an arrangement for producing a picture of paths of motion on the picture screen of a cathode ray tube, wherein the instantaneous location of the observing ship is constantly depicted in the centre of the picture screen, will be explained with reference to the diagrammatic circuit shown in FIGURE 2. The box 18 represents the transmission and reception section of a radar set with a rotatable antenna. The received voltage is delivered through the line 26. The circles 19 and 20 represent image storage tubes of the kind illustrated in FIGURE 1. The circle 21 represents a cathode ray tube with a picture screen on which the picture of paths of motion appears. By means of switches 22, 23, which correspond to the switch 9 in FIGURE 1, a variable voltage is fed to the image storage tube 19 or 20 to control the intensity of the recording electron beam, when the said switches are in the bottom position. The switches 24, 25 correspond in their mode of operation to the switch 11 in FIGURE 1 and when a picture storage tube is scanned they are switched on to take off the variable voltage so produced. While the image storage tubes 19 and 20 have deflecting devices for a periodic and a static deflection of the electron beam (the coils 7 and 8 in the FIGURE 1), the picture tube 21 is provided with only one device for the periodic radial deflection of the electron beam. For the screens of the tubes 19, 20, 21 a picture axis B is fixed which for the two image storage tubes is to coincide with the north direction in the picture, while the orientation of the picture visible on the picture screen 21 may be selected as desired. Accordingly, the direction of the periodic deflections in the storage tubes varies in accordance with Equation 3; in the picture tube, with Equation 2. The switches 23 and 24 on the one hand, and the switches 22 and 25 on the other are alternately thrown down for the duration of one antenna revolution. Recording is effected in one storage tube and scanning in the other for the same time. At the beginning of each recording in the storage tubes the additional deflection of the electron beam corresponding to the progress of the observing ship is zero, that is, the recording begins with the initial point of the periodic deflections lying in the centre of the screen. If, for example, the static deflection of the electron beam in the storage tubes is regulated by means of potentiometers, which feed deflecting coils and are adjusted in accordance with the variation of the location of the observing vessel, these potentiometers must, at the beginning of each recording, be returned to zero and the integration of the course of the observing ship begins for each recording again with the value zero.

Let it be assumed that at the beginning of a rotation of the antenna the image storage tube 19 already contains a picture of paths of motion formed previously, while the image storage tube 20 is erased. The starting point of the periodic beam deflections is displaced from the centre in the image storage tube 19 in accordance with the progress of the ship during the preceding antenna revolution while in the storage tube 20 it is situated at the centre of the screen. In the position illustrated for the switches 22, 23, 24, 25 the storage tube 19 is scanned during the now following antenna revolution and the existing picture transferred through the switch 24, the line 27 and the switch 23 to the storage tube 20. At the same time the instantaneous pictures simultaneously received by the radar set are added correctly as to position by mixing in the radar set received voltage arriving through the line 26. Through the lines 27 and 28 the picture tube 21 is fed with the same picture voltage as the storage tube 20, so that on the screen of the picture tube 21, which for this purpose has a certain image persistence, the completed picture of the paths of motion is also recorded—but visibly. On completion of the antenna revolution in question, the picture storage tube 19 is erased and the picture contained therein completely transferred to the picture storage tube 20, where the starting point of the periodic deflections has moved out of the centre of the picture during the transfer in accordance with the travel of the ship. The switches 22 and 25 are now brought into the bottom positions and the switches 23 and 24 into the upper. Also, the starting point of the periodic deflections in the image storage tube 19 is returned to the centre of the picture. In the same manner as described, the picture existing in the storage tube 20 is now transferred, being completed by the simultaneous instantaneous pictures, to the storage tube 19 and simultaneously rendered visible again on the screen of the tube 21. Since the picture re-appearing on tube 21 has a position differing somewhat from the position of the picture recorded on the preceding antenna revolution, it is important so to select the duration of image persistence on the picture tube such that the portions of the picture recorded during one revolution of the antenna by the circular path of the electron beam have a brilliance uniformity sufficient for the joint viewing, but on the other hand sufficiently short so that the retained image of earlier pictures does not unduly interfere with the viewing of the latest picture. A certain unilateral widening and unsharpness of the pictures of paths of motion and also of the pictures of fixed targets cannot, it is true, be avoided with this method. Provision can therefore be made for an erasure beam confined to a narrow sector to rotate simultaneously with the circular path of the electron beam and with a slight lead.

Figure 3:
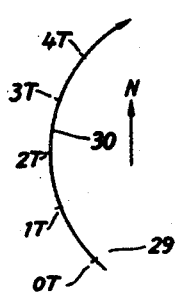
FIGURE 3 shows a course (assumed by way of example) of a ship provided with a radar set with an arrangement according to the invention.

The position-correct addition of a new instantaneous picture into a stored picture of paths of motion is effected by the expedient that on the transfer of the stored picture the electron beam scans the latter from a point corresponding to the instantaneous location of the ship in the picture and in a direction in the picture corresponding to the instantaneous direction of radiation of the antenna. For the sake of clarity, the travel of the starting point (corresponding to the location of the observing ship) of the periodic beam deflections in accordance with Equation 5 on the screens of the storage tubes is illustrated diagrammatically in FIGURES 4 and 5, to represent the course of the observing ship as shown in FIGURE 3. This begins with the beginning of a determined revolution of the antenna at the point 29 and continues over the path 30. The circular surfaces 31, 33 in FIGURES 4 and 5 indicate the screen surfaces of the two storage tubes 19 and 20 respectively, these two surfaces being drawn far too small in relation to the travel of the picture of the observing ship, for the purpose of saving space. The centres of the screens are denoted by references 32 and 34. The course of the ship is divided up, in accordance with the successive antenna revolutions, into sections corresponding to segments of the course of the observing ship displayed on the picture screens. The points reached successively are indicated in sequence by 0T, 1T, 2T and so on. The segments of the course of the observing ship on which a recording is effected in the relevant picture tube, are indicated as continuous lines, while the course segments where scanning and simultaneous erasure are effected are indicated by broken lines. In the left-hand storage tube, the picture of the observing vehicle is momentarily returned to the centre of the picture each time scanning is completed, at the times 1T, 3T and so on, while in the right-hand storage tube this occurs at the times 0T, 2T, 4T and so on. On the scanning of the stored picture, the scanning beam begins each time at the same point as that at which the recording beam ceased.

During the travel of the pictures of the observing ship on the picture screens of the storage tubes, the picture of the observing ship on the screen of the picture tube 21 always remains stationary in the centre. The path of the observing ship extends outward from this point. It will readily be seen that if the pictures existing in the storage tubes are to be rendered visible without distortion on the picture screen, the picture of the observing ship must travel on said screen, as is the case in the devices described in the cited copending application. Then, however, the picture of the observing ship would after some time come so close to the edge of the screen that it would be necessary to return it toward the centre. With the present invention, this is not accompanied by a loss of the picture of the paths of motion recorded until then however, as is the case in the device according to the copending application, said picture being in any case retained in the storage tubes. Operation of this kind can therefore be considered, in which case, of course, an additional device for the static displacement of the picture of the observing ship in accordance with the progress of said ship must be provided at the picture tube 21. The unilateral unsharpness of the picture described hereinabove is avoided with this mode of operation. In addition, since no excessive image persistence period is necessary the superimposition of two pictures occurring on the return of the picture of the observing ship is only of short duration. For this reason the picture of the observing ship can also be returned to the centre of the picture screen at short intervals of time, so that it never moves far away from said centre. If the viewer is offered a course-oriented picture on the picture screen, then on changes of course the picture tube 21 is to be turned about its longitudinal axis with the picture screen in opposition to said changes of course, in order to avoid the interference caused by the retained images of earlier pictures when the picture orientation on the screen is changed. In contrast to the arrangement according to the copending application, the visible length of the path of motion does not depend on the persistence of the screen, but is limited only by the total duration of the recordings or the screen size.

Figure 2:
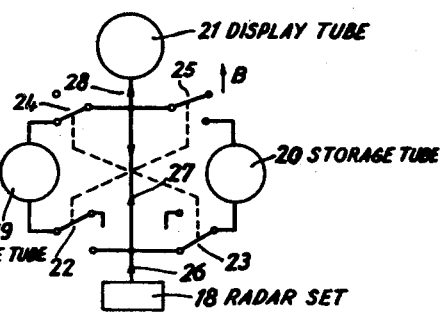
FIGURE 2 is a circuit arrangement for producing a picture of paths of motion on the afterglow picture screen of a cathode ray tube, using two image storage tubes of the kind shown in FIGURE 1, from the instantaneous pictures of a radar set.

As already indicated in the introduction to the description, in the arrangement shown in FIGURE 2 it is possible to provide two picture tubes 21, to which the picture present in the storage tubes is transferred with travel of the picture of the observing ship, and which are operated alternately at intervals of time greater than the image persistence period, that is, some minutes, for example, and which are alternately presented for viewing, for example, by means of a hinged mirror. In this way, a superimposition of earlier and later pictures due to image persistence is dependably avoided, while the observable length of the recorded paths of motion is limited only by the finite size of the picture screen. Moreover, the unilateral limitation of the field of view in consequence of the travel of the observing ship's image, which is returned to the centre of the relevant screen at the beginning of each observation, remains small within the short period of operation of each picture tube. In this and the previously described arrangement the return of the picture of the observing ship and/or the change of the picture surface viewed can take place automatically at determined times without the attention of the viewer thereby being unduly occupied.

If, as described first for the arrangement shown in FIGURE 2, the last picture of the observing ship at any given time is constantly kept in the centre of the screen of the picture tube 21, the portions of the total picture recorded successively by the circular path of the electron beam appears in a somewhat mutually displaced position, this effect being all the greater, the greater the interval of time in which recording of said portions is carried out. The maximum time difference arising for portions of the total picture to be viewed simultaneously corresponds to one revolution of the antenna. The displacement of the pictures of one and the same object recorded in this interval of time usually amounts to less than 1 millimetre and bearings of fixed targets and the course directions of other ships to be extracted from the picture are similarly only insignificantly falsified. If in particular a course-oriented picture is produced on the screen in this case, then on changes of course of the observing ship an additional picture error arises due to the fact that the successively recorded radial portions of the total picture are angularly oriented somewhat falsely in relation to one another. This error can also generally be disregarded and disappears again when the change of course ceases. It can be avoided if the picture tube 21 is rotated about its longitudinal axis with the picture screen by an angle of equal magnitude but opposite sense to the changes of course made. When the picture of the observing ship is held fast in the centre of the picture screen, this has the advantage that the field of view constantly extends equally far in all directions and that the bearing of a target can be taken in the customary way with an adjustable mechanical bearing line passing through the centre of the picture screen.

It might also be imagined that the recording time of the storage tubes could be made equal to that of two or more antenna revolutions instead of to the duration of one antenna revolution, but that would have the disadvantage that the picture visible on the picture screen would be renewed less frequently.

In order that the speed of the observing ship and of other ships may also be recognisable from the picture of the paths of motion, time markers are produced by the expedient that at intervals of 10 antenna revolutions for example; that is, about 30 seconds, no new instantaneous pictures are added, for the period of one revolution of the antenna, to the pictures present on the picture screen of the storage tubes 19, 20 (FIGURE 2), this being effected, for example, by interrupting the line 26. In consequence, gaps occur in the paths of motion of moving targets, the distance between the gaps being all the greater the more rapidly the target in question moves.

Figure 6:
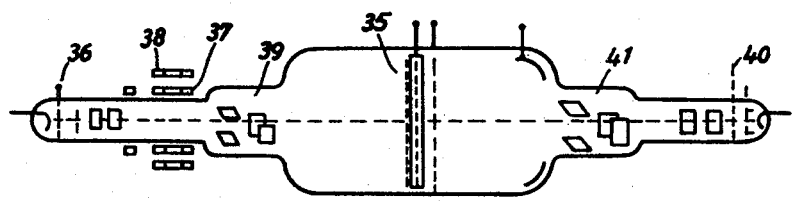
FIGURE 6 shows an image storage tube having a picture screen which accepts data for recording delivered by an electron beam from the front side and, independently thereof, can be scanned by a second electron beam from the back to release the recorded data.
Figure 10A:
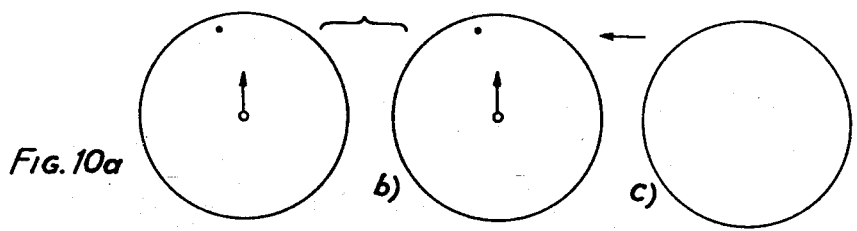
Figure 11A:
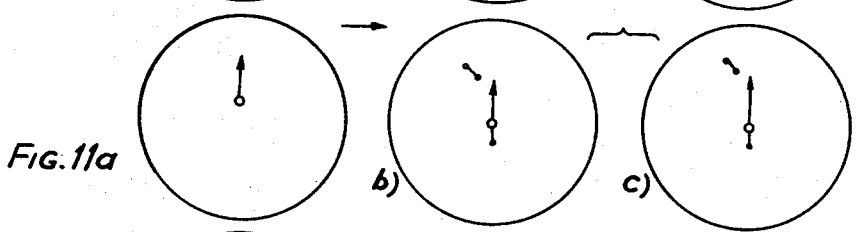
Figure 12A:
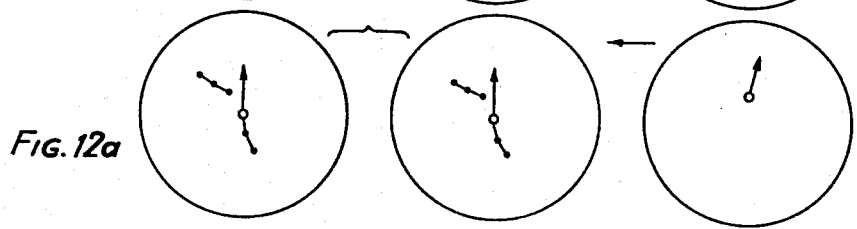
Figure 13A:
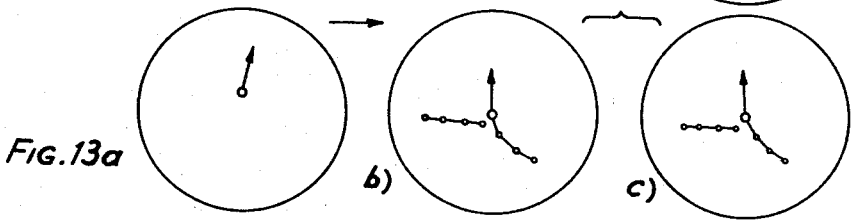
Figure 14A:
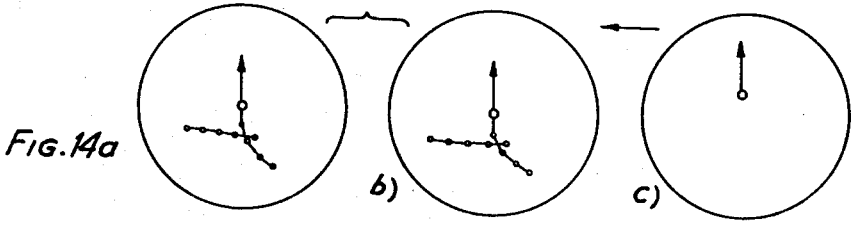
Figure 15A:
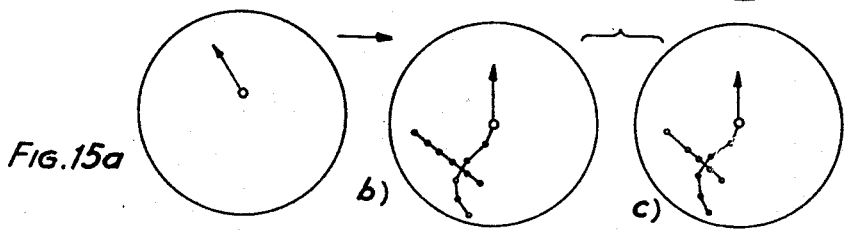

Further embodiments of the invention are based on the utilization of a dual-gun cathode-ray recording storage tube, as shown in FIG. 6, capable of simultaneous writing and reading. (See Perato, Ensemble de transformation d'image TI 440, Bücherei der Funkortung, Volume 5, Part III, page 92). The picture screen 35 consists of a thin insulating plate carried by a fine-mesh grid. This plate is scanned from the left-hand side by an electron beam modulated by the received voltage of a radar set (or if desired also by the scanning voltage of a second storage tube) by way of the grid 36, said electron beam producing a charge distribution on the screen by induced conductivity. The periodic radial deflection of the electron beam is effected in the manner conventional to radar picture tubes by rotating coils 37. In addition, deflecting coils 38 are provided for a static displacement of the starting point of the periodic radial beam deflections in accordance with the progress of the observing ship. Instead of the periodic radial deflections of the recording beam, in one particular embodiment of the invention it is possible to make use selectively of rectangular scanning to deflect the electron beam in accordance with a line pattern, for which deflecting plates 39 may be provided. The recorded picture screen is scanned from the right-hand side by a second electron beam modulated at 20 mc./s. through the grid 40 and deflected to a line pattern by deflecting plates 41. The scanning voltage modulates the electron beam of a television tube guided to the same line pattern and the picture stored on the picture screen 35 rendered visible. In consequence of the scanning of the picture, the picture stored on the picture screen 35 may be completely reproduced and thus be maintained for about an hour. If desired, it may be completed by further recordings, or else it can be practically instantaneously erased by simple voltage change-over. The recording and scanning of the picture screen are possible without any mutual interference. The television scanning is effected at 50 frames per second and renders constantly visible the picture stored on the picture screen 35. The image persistence of the television tube is imperceptible to the eye.

The diagrammatic illustration shown in FIGURE 7 serves to explain the mode of operation of an arrangement using two storage tubes of the kind shown in FIGURE 6 to produce a picture of paths of motion from the instantaneous pictures of a radar set. Like the box 18 in FIGURE 2, the box 46 corresponds to the transmission and reception section of a radar set having a rotated antenna. The two storage tubes are denoted by references 47 and 48, a television tube by 49.

The periodic deflection of the recording beam in the tubes 47 and 48 is effected in accordance with Equation 3 by rotatable coils 37 as in a radar picture tube (the deflecting plates 39 are not required here). The scanning beams in the tubes 47, 48 and the recording beam in the tube 49 are periodically deflected to a line pattern by deflecting plates. All three tubes have additional deflecting coils (for the tubes 47, 48 corresponding to 38 in FIGURE 6) for an intermittent static displacement of the recording beam from the position of rest in accordance with the progress of the observing ship. For the tube 49 this displacement is opposed to the direction of the movement of the observing ship's picture. By way of switches 50, 51, which are coupled to other switching means for a change-over of the coil currents for the static displacements, the scanning voltage of the two storage tubes 47, 48 is fed alternately to the picture tube 49 for the duration of one change-over period $p$ which is selected, according to the measuring range used and the speed of travel, to be about 5 to 20 minutes. The two storage tubes 47, 48 regularly record the received voltage of the radar set so that pictures of true paths of motion form, the starting points of the periodic radial beam deflections being displaced in accordance with the progress of the observing ship, with the picture axis corresponding to the north direction. Simultaneously, with each of the opposed operations of the switches 50, 51 the storage tube no longer scanned is erased and the starting point of the periodic beam deflections in this storage tube is returned to the centre of the screen. The additional static displacement of the position of rest of the electron beam of the picture tube 49 is in each case for the duration of a change-over period $p$ made oppositely equal to the displacement of the starting point of the periodic deflections of the beam in the storage tube just scanned. As a result the picture applicable at each instant for the observing ship on the picture screen of the television tube is stationary, while the picture of the paths of motion gradually shifts.

With this method it will generally be necessary to accept a certain reduction of the minimum visibility and of the visible length of the paths of motion. This can be avoided to a greater or lesser degree, however, by providing three or more storage tubes which are recorded in staggered manner per unit of time and are successively scanned.

The carrying out of the additional displacement of the electron beams in the three tubes 47 (I), 48 (II), 49 (III) in FIGURE 7 in accordance with the progress of the observing ship is explained with reference to FIGURE 8. The displacements are composed from displacement components in the west-east and south-north direction, which are produced by coils 52 to 57. Individual coils are shown instead of pairs of coils for the sake of clarity. The coils are fed with variable currents by the diagrammatically indicated potentiometers 58 to 61. By means of switches 62, 63 the coils 56, 57 can be connected together to either the coils 52, 53 or the coils 54, 55, so that they carry the same currents as the latter. The coils for displacements in the west-east direction and the south-north direction (for the tubes 47 and 48; for the tubes 49 in the opposite direction) are fed with currents which are respectively proportional to:

(6) $$u = \int_{t_0}^{t} w \cdot \sin \zeta \, dt \text{ and } v = \int_{t_0}^{t} w \cdot \cos \zeta \, dt$$

the time $t$ being counted as from the beginning of a first change-over period and $t_0$ for each of the three tubes 47, 48, 49 at determined intervals of time being made equal to the instantaneous value of $t$. The coil currents are taken from potentiometers 58 to 61, which are adjusted in accordance with the values of $u$ and $v$ supplied by a course computer (not shown). After the expiration of a change-over period $p$ the potentiometers 58, 59 and 60, 61 are alternately returned to zero whereby a new value for the lower integration limit $t_0$ is set. The variability per unit of time of the integration limits in successive change-over periods will be clear from Table I.

*Table I*

| Time | | Value of $t_0$ to be used with— | | | Switches | | |
|---|---|---|---|---|---|---|---|
| From— | To— | Tube 47 | Tube 48 | Tube 49 | 50 | 51 | 62/63 |
| np | (n+1)p | (n−1)p | np | (n−1)p | + | − | I |
| (n+1)p | (n+2)p | (n+1)p | np | np | − | + | II |
| (n+2)p | (n+3)p | (n+1)p | (n+2)p | (n+1)p | + | − | I |
| (n+3)p | (n+4)p | (n+3)p | (n+2)p | (n+2)p | − | + | II |
| (n+4)p | (n+5)p | (n+3)p | (n+4)p | (n+3)p | + | − | I |

NOTE.—The closed position of the switches is indicated by +, the open position by −.

On the production of a course-oriented picture, the deflecting coils 56, 57 are to be rotated in opposition to the change of course about the axis of the television picture tube. A rotation of the tube itself is not necessary owing to the low image persistence of the television picture tube.

In the arrangement shown in FIGURE 9, use is made of two image storage tubes of the kind shown in FIGURE 6 with additional deflecting plates 39. It is thereby possible to transfer the picture of one storage tube, which picture is taken off by line scanning and rendered visible on the screen of the television tube 49, to the screen of the other storage tube without viewing being interrupted. By throwing over the switch 68 the picture screen of the tube 64 alternately stores the received voltage of the radar set 46 to update the already existing picture and the starting point of the periodic beam deflections is displaced in accordance with the progress of the observing ship. It is simultaneously scanned by an electron beam guided line-wise and the stored picture constantly rendered visible on the screen of the tube 49. On each operation of the switch 68 circuit means are simultaneously operated whereby the picture of the tube no longer in operation is erased. At the same time, the potentiometers 58, 59, for regulating the current of the coils for the additional deflection of the recording electron beams in accordance with the progress of the observing ship, are set to zero. The switches 69, 70 associated with the storage tubes 64, 65 serve to transfer to the other screen the picture present on the screen of one storage tube. The periodic radial deflection of the recording beams in the tubes 64, 65 in accordance with the direction of radiation of the antenna is controlled by the generator 66. The generator 67 produces the voltages required for the deflection of electron beams by the line method. In the top position of the switches 69, 70 the recording beams of the tubes 64, 65 are periodically deflected in a variable radial direction and simultaneously by means of the coils 52, 53 and 54, 55 respectively undergo the additional deflection required to represent the progress of the observing ship. If one of the switches 69 or 70 is in the lower position, the direction of the additional deflection is reversed by switching over the coils 52, 53 and 54, 55 respectively. Deflection of the recording beams in accordance with the radar set is put out of operation; and deflection according to the line method occurs instead. In addition, the scanning voltage, present at the picture tube 49, of the other storage tube is fed to the grid of the recording beam, which in this case does not respond to the received voltage of the radar set.

In order to transfer to the screen of the tube 65 in the switch position illustrated a picture present on the picture screen of the tube 64, the switch 70 is thrown down for a brief period shortly before the switch 68 is thrown over and when the potentiometers 58, 59 have not yet been returned. The scanning voltage of the tube 64 thereby modulates the synchronously deflected recording beam of the tube 65. The displacement of the starting point of the periodic beam deflections on the screen of the tube 64 is eliminated by a contradirectional deflection of the recording beam of the tube 65, so that the picture of the observing ship lies in the centre of the picture screen of the tube 65. After the transfer of the picture, which now occupies only a short time, the switch 70 is brought back into the upper position, the potentiometers 58, 59 returned to zero, and at the same time the switch 68 thrown to the right. On the further recording of the received voltage of the radar set on the screen of the tube 65 the picture of the observing ship now travels from the centre. The rapidity at which this takes place determines the duration of the change-over period. On the screen of the picture tube 49 the travel of the picture of the observing ship is eliminated, as already stated, by an opposed additional deflection.

Figure 4:
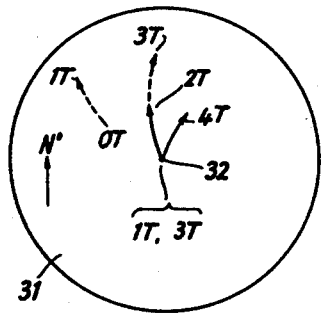
FIGURES 4 and 5 show the intermittent static displacement of the starting point of the periodic radial deflections of the scanning electron beam in the two storage tubes of FIGURE 2.
Figure 5:
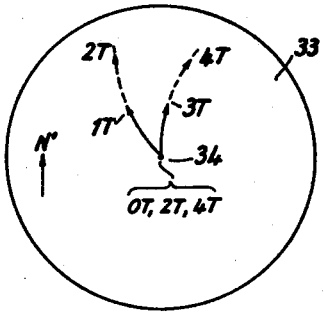

When an electron beam has to be deflected in accordance with the progress of the observing ship over relatively short times up to about 1 minute, as illustrated in FIGURES 4 and 5, the following method of approximation may be used inter alia, it being assumed that the short distances to be represented may be approximated by circular arcs. Only one rotatable pair of coils is provided, which at the beginning of each recording is so adjusted from the compass installation in relation to the north direction on the recording surface that the direction of deflection corresponds to the simultaneous course, and to which a current is fed which increases from the value zero in accordance with the distance covered. During the period of recording and the subsequent scanning of the picture screen, the initial deflection direction of the coils is turned only in accordance with half the change of the course angle. On completion of the scanning and at the beginning of the next recording the still lacking rotation is suddenly supplied simultaneously with returning the deflecting current returned to zero. For the first purpose, that is the adjustment of the direction of deflection, it is possible for example to provide for the coils to be driven by a shaft adjusted in accordance with the course, directly through a torsion spring and simultaneously through a gear having a transmission ratio of 2:1 and a coupling which is broken for a short time at the beginning of each recording. For the second purpose, a potentiometer, which constantly tends to return a spring into the zero position, can be adjusted in accordance with the speed of revolution of a shaft through a coupling which is broken for a short period simultaneously with the abovementioned coupling.

For small integration times covering two antenna revolutions for example, use can be made of a method of approximation accompanied by further simplifications and based on the assumption that the course can be regarded as rectilinear over short sections and this method will now be described for the case shown in FIGURE 2. The angle of the direction of radiation at any time to the ahead direction will be $$\sigma_s = \frac{2\pi}{T} t$$

$t$ being reckoned from the beginning of a first antenna revolution. The angle of the direction of the periodic deflections of the electron beam with the picture axis in the tubes 19, 20, 21 will be assumed to be $\sigma'$, $\sigma''$, $\sigma'''$.

As always:

$$\sigma''' = \frac{2\pi}{T}t + \zeta(t) - \chi$$

it being remembered that $\chi$ denotes the orientation of the picture and that when $\chi=0$ a north-oriented picture is obtained and when $\chi=\xi$ a course-oriented picture. The values of $\sigma'$, $\sigma''$ change with the antenna revolutions in accordance with Table II. Periods of a uniform change in accordance with the simultaneous change of the course angle $\xi$ are followed in each case by an abrupt return to zero. Such a change of the direction of deflection can easily be achieved for example by inserting in the transfer line for the transfer of the antenna angle to the deflecting coils a differential synchro which is rotated through a coupling in accordance with the course angle and is returned into the initial position by a torsion spring on brief release of the coupling after each two antenna revolutions. The displacement of the initial point of the periodic beam deflections in accordance with the progress of the observing ship in the tubes 19 and 20, which displacement is denoted by $s'$ and $s''$ respectively and in these two tubes always takes place in the direction of the picture axis, is likewise indicated in Table II.

ture in the storage tubes is important only insofar as slip ring feeds to the storage tube can thereby be dispensed with or the mechanical expenditure for the required mutual displacements of the storage tube and the deflecting means can be reduced.

Instead of the continual change of $\sigma'$, $\sigma''$, $s'$ and $s''$, it is also possible to use on each occasion between the recording and scanning of a storage tube an abrupt change of the direction of the periodic deflections and a similar displacement of the starting points of the periodic deflections of the beam in this tube in accordance with the change of the course angle and with the path covered during the preceding antenna revolution, which is again cancelled at the beginning of the next recording.

For the sake of illustration, the formation of a picture of paths of motion from the superimposition of individual radar pictures in this method is shown in FIGURES 10 to 15. $a$ and $c$ respectively indicate the screens of the two storage tubes, and $b$ the picture screen viewed. The picture axis B extends vertically from bottom to top. The picture viewed is to be course-oriented, so that the picture axis constantly corresponds to the course direction in the picture. The pictures on the screens of the storage tubes are also course-oriented in accordance with

*Table II*

| Time | | $\sigma'$ | $\sigma''$ | $\frac{1}{m}s'$ | $\frac{1}{m}s''$ | Scanned tube | Recorded tube |
|---|---|---|---|---|---|---|---|
| From— | To— | | | | | | |
| $nT$ | $(n+1)T$ | $\frac{2\pi}{T}t+\zeta(t)-\zeta\{(n-1)T\}$ | | $s(t)-s\{(n-1)T\}$ | | 19 | 20 |
| $(n+1)T$ | $(n+2)T$ | | $\frac{2\pi}{T}t+\zeta(t)-\zeta(nT)$ | | $s(t)-s(nT)$ | 20 | 19 |
| $(n+2)T$ | $(n+3)T$ | $\frac{2\pi}{T}t+\zeta(t)-\zeta\{(n+1)T\}$ | | $s(t)-s\{(n+1)T\}$ | | 19 | 20 |
| $(n+3)T$ | $(n+4)T$ | | $\frac{2\pi}{T}t+\zeta(t)-\zeta\{(n+2)T\}$ | | $s(t)-s\{(n+2)T\}$ | 20 | 19 |
| $(n+4)T$ | $(n+5)T$ | $\frac{2\pi}{T}t+\zeta(t)-\zeta\{(n+3)T\}$ | | $s(t)-s\{(n+3)T\}$ | | 19 | 20 |
| | | | $\frac{2\pi}{T}t+\zeta(t)-\zeta\{(n+4)T\}$ | | $s(t)-s\{(n+4)T\}$ | | |

The path of the observing ship is:

$$s(t) = \int_0^t w\, dt$$

The scale of representation (for example 1:120,000) is denoted by $m$. These displacements also vary uniformly from time to time in accordance with the paths covered and are returned to the value zero from time to time. A variable displacement of this kind can be obtained for example by adjusting a potentiometer, from which an additional pair of deflecting coils is fed, in accordance with the revolutions of a shaft with the interpositioning of a coupling, which is broken for a short period after each two antenna revolutions, the potentiometer being returned to the zero position by a spring (cp. Table II). From this table it will be seen that on the scanning of a picture screen the starting point and the direction of the periodic deflections of the electron beam have been varied, in relation to the same values for the electron beam with which recording was previously carried out at the time of one antenna revolution, in accordance with the path covered in this time and the change made in the course, that is to say in the same way as the position of the ship and the direction of radiation of the antenna have changed in the same time.

It is further found that with this method the pictures of paths of motion on the screens of the storage tubes are kept course-oriented constantly with only slight deviation, as is also the case with the modification of this method described below. It is further pointed out that for the mode of operation only the relative angle orientation of the storage tube and appertaining deflecting means is concerned. The orientation actually used for the picthe previously given description. The individual illustrations show in stages the building up of the course line of the observing ship and of another ship approaching on the port bow, at intervals of one antenna revolution. The radar pictures being newly added are recorded alternately on the screens $a$ and $b$ or $c$ and $b$ simultaneously, this being indicated by the bracketed figures. The direction of the transfer of the picture from the scanned storage tube to the other two tubes is indicated by an arrow between the partial pictures. Each recorded picture remains in the storage tubes as a local charge of the picture screen until the scanning on the next revolution of the antenna, and on the observed screen by afterglow effect likewise for one revolution of the antenna or somewhat longer. The starting point of the periodic deflections of the scanning electron beam is indicated by a small circle. On the scanning of a storage tube it is displaced from the centre in the direction of the picture axis in accordance with the path during the last revolution of the antenna. The attached arrow indicates the direction of the radial deflection path of the electron beam corresponding to the ahead direction of the antenna. In the case of dead ahead travel, this arrow coincides with the picture axis. If the ship has turned during one revolution of the antenna, the direction of the arrow deviates from the picture axis in accordance with the value of this turn. The figures show how an impending collison has been recognised in good time from the picture of the true paths of motion (FIGURE 11) and avoided by an evasive maneuver.

In comparison with the methods according to FIGURES 4 and 5 or FIGURE 8, the abovedescribed methods of approximation have the advantage that only one pair (fixed or rocked only over a small angle range) of additional deflecting coils is required for the storage tubes and that a simple path measurement is sufficient. The total picture produced on the screens of the storage tubes by one or other method of approximation can be presented on the picture tube 21 as desired either with a stationary picture for the observing ship or, with appropriate additional deflecting means, with travel of this picture. In addition, as already described, two picture tubes can be used alternately.

Instead of adopting the procedure indicated for the sake of simplicity in the exemplified embodiments, namely allowing the travel of the starting point of the periodic deflections of a scanning electron beam in accordance with the progress of the observing ship to begin after each return from the centre of the screen, which is also the position of rest of the electron beam, other techniques may be employed. It is possible, especially in cases where the recordings are continued without return during a relatively large number of antenna revolutions, to allow the travel of the starting point to begin from a point displaced from the centre of the screen by the amount of the change of position of the observing ship which took place since the last return in one of the two alternately recorded tubes, and in the opposite direction thereto. (In the arrangement shown in FIGURE 9, only half of this time is to be used.) This means that the starting point is moved back from the centre by half the total displacement expected. By this measure the reduction of the range of visibility in the ahead direction through the travel of the observing ship on the picture screen is halved. The change of position of the ship in a corresponding time can be furnished by adjusting two potentiometers, for example in accordance with the Equations 6 and the static deflection of the starting point of the deflections of the beam be added as a constant amount at the beginning of the new recording. This additional constant deflection is maintained until the continuous recording of the screen in question is interrupted. In the arrangement shown in FIGURE 9 it must be operative already on the transfer of the picture to the other storage tube. More particularly, it is operative during the transfer of the picture from one storage tube to the other jointly with a deflection which is equal and opposite to the deflection of the picture of the observing ship from the centre of the scanned screen. This latter deflection is composed of the constant deflection set at the beginning of the recording of data on this screen and the travel of the observing ship which took place during the recording.

In the devices according to the invention manually operated electrical and mechanical change-over devices may be provided which enable a picture of paths of motion oriented constantly to the course of the observing ship or to any desired compass direction to be presented for viewing at will.

We claim:

1. Apparatus for visually displaying the paths of motion of objects in the vicinity of a moving vehicle comprising, means located on said vehicle for repetitively scanning said vicinity to derive echo signals representative of the position of said objects with respect to said vehicle, at least one image storage tube, a display tube, means for storing said echo signals derived from a scan on said image storage tube in positions displaced from a starting point representative of said vehicle by an angle and distance corresponding to the bearing and distance of the associated object relative to said vehicle, means for repetitively transferring the picture stored on said image storage tube to said display tube and displacing said starting point in accordance with the progress of said vehicle to provide a representation of said paths of motion on said display tube.

2. A method of providing a visual display of the true paths of motion of objects in the vicinity of a moving vehicle which method includes the steps of repetitively scanning said vicinity to derive echo signals indicative of the position of said objects with respect to said vehicle, recording the echo signals derived on a scan on the screen of at least one image storage tube by deflecting and controlling the intensity of the storage tube recording electron beam in accordance with the position of the objects represented by the echo signals with respect to said moving vehicle to store a picture of the object and vehicle positions, repetitively transferring the stored picture to a display tube by deflecting a reading electron beam in said storage tube, and imparting an additional deflection to at least one electron beam corresponding to the progress of said moving vehicle to maintain the image representative of the position of said vehicle on said display tube substantially fixed.

3. A radar display system adapted for use on a movable vehicle comprising a radar transmitter having a rotatable directional antenna, a radar receiver, a memory tube having a storage surface adapted to be scanned by an electron beam on which surface electrical signals representing stationary objects are stored and signals representing moving objects draw tracks, means for impressing the output of said receiver upon the input circuit of said memory tube, a radial sweep generator coupled to said memory tube to deflect said electron beam, means coupled to said memory tube for causing said radial sweep to rotate in synchronism with said antenna, means coupled to said memory tube for causing the origin of the rotating radial sweep to move in correspondence with the course and speed of said moving vehicle, means for reading out recorded information in the form of electrical signals from said memory tube and means for applying said recorded information electrical signal to a display device for visually displaying recorded information.

4. Apparatus for visually displaying the paths of motion of objects in the vicinity of a moving vehicle, comprising, means located on said vehicle for repetitively scanning said vicinity to derive echo signals representative of the position of said objects with respect to said vehicle, first and second image storage tubes, means for storing said echo signals derived from consecutive scans respectively on said first and second image storage tubes in positions displaced from a starting point representative of said vehicle by an angle and distance corresponding to the bearing and distance of the associated object relative to said vehicle, means for exchanging the stored echo signals between said image tubes and displacing said starting point in accordance with the progress of said vehicle to develop stored representations of said paths of motion on said image tubes.

5. Apparatus in accordance with claim 4, and further comprising, a display tube, and means for visually displaying said stored representations upon said display tube.

6. A method of providing a visual display of the true paths of motion of objects in the vicinity of a moving vehicle which method includes the steps of repetitively scanning said vicinity to derive echo signals indicative of the position of said objects with respect to said vehicle, recording the echo signals derived on consecutive scans respectively on the screens of first and second image storage tubes by deflecting and controlling the intensity of the storage tube recording electron beams in accordance with the position of the objects represented by the echo signals with respect to said moving vehicle to store a picture of the object and vehicle positions, periodically transferring the picture stored by one of said storage tubes to the other and vice versa by deflecting reading electron beams in said storage tubes to release the stored echo signals from said screens, imparting an additional deflection to the storage tube electron beams in accordance with the distance and direction of movement of said vehicle during each of the periods between the beginning of a transfer of the stored picture to the associated tube and the end of the subsequent transfer of a stored picture from the latter tube, said additional deflection being zero at the beginning of each of the last named periods, whereby the image representative of the position of said vehicle remains very close to the centre of said screens.

7. A method in accordance with claim 6, and further including the step of visually displaying the stored pictures.

8. In the production of a picture of the tube paths of motion of radar targets, wherein instantaneous pictures obtained with a radar set located on a travelling ship of the position of targets with respect to the observing ship are joined together and recorded over a relatively long time on a picture surface with mutually coincident orientation and with displacements corresponding to the progress of the observing ship, apparatus comprising, first and second storage tubes, means for recording instantaneous pictures in the form of a charge picture on the picture screens of said picture storage tubes, said means for recording including a source of an electron beam, means for periodically deflecting said electron beam from a starting point synchronously in relation to the pulse emissions of said radar set and in a radial direction changing in accordance with the direction of radiation of the radiator of said set so that the recorded instantaneous pictures are added correctly with respect to position to the pictures of paths of motion stored on said picture tube screens, and means for maintaining the instantaneous image of said observing ship substantially in a predetermined fixed position on said screen to substantially continuously derive an indication of the true paths of said targets, the latter means including means for effectively displacing the recorded instantaneous pictures in correspondence with the progress of said observing ship.

9. Apparatus in accordance with claim 8 and further comprising, means associated with said storage tubes for changing the picture of paths of motion present on the picture surface of said storage tubes during alternating time intervals, a display tube, synchronized scanning means for recovering a picture signal from that one of said storage tubes whose picture was changed during the preceding one of said time intervals and applying said signal to said display tube to display the most recent picture on said one tube, said means for maintaining the instantaneous position of said observing ship substantially in said predetermined position comprising, means associated with said synchronized scanning means for deflecting said one storage tube electron beam a fixed amount corresponding to the vector change in position of said observing ship during the preceding two of said time intervals.

10. Apparatus in accordance with claim 9 wherein each of said storage tubes comprises, sources of first and second electron beams arranged to impinge upon opposite sides of said picture screen, said recording means including first scanning means synchronized with said pulse emissions and said direction of radiation for deflecting said first electron beam, said synchronized scanning means including second scanning means for deflecting said second electron beam.

11. Apparatus for visually displaying the paths of true motion of objects in the vicinity of a moving vehicle, comprising means located on said vehicle for repetitively scanning said vicinity to derive echo signals representative of the position of said objects with respect to said vehicle, a first and a second single-gun cathode-ray storage tube capable of alternative operation in the write and read mode and having means for erasing the stored information when reading, means for storing said echo signals derived from consecutive scans respectively on said first and second image storage tubes in positions displaced from a starting point representative of said vehicle by an angle and distance corresponding to the true bearing and the distance of the associated objects relative to said vehicle, means for continuously displacing said starting point in accordance with the progress of said vehicle so as to produce a charge pattern in which sequential echo signals are fitted to form paths of true motion, means for reading out the composite charge pattern of stored signals in either of said storage tubes during scan periods alternating with the scan periods in which signals are stored in each tube, means for transferring the charge pattern read out to the storage screen of the other tube and simultaneously displacing the charge pattern as a whole relative to the storage screen so as to annul the previous displacement of the starting point, a picture tube, and means for simultaneously displaying the charge pattern read out in combination with newly stored signals on the screen of said picture tube, said screen having a persistence in the order of the scan period.

References Cited in the file of this patent

UNITED STATES PATENTS

| | | |
|---|---|---|
| 2,474,628 | Hurvitz | June 28, 1949 |
| 2,589,584 | Thompson | Mar. 18, 1952 |
| 2,702,356 | Flory | Feb. 15, 1955 |
| 2,716,203 | Sen et al. | Aug. 23, 1955 |
| 2,804,613 | Haworth | Aug. 27, 1957 |